United States Patent [19]

Nakamura et al.

[11] Patent Number: 4,785,354

[45] Date of Patent: Nov. 15, 1988

[54] TIRE LOAD TEST CT SCANNER

[75] Inventors: Shigeo Nakamura, Mitaka; Katsutoshi Nakashima, Hachiooji, both of Japan

[73] Assignees: Bridgestone Corporation, Tokyo; Kabushiki Kaisha Toshiba, Kawasaki, both of Japan

[21] Appl. No.: 813,874

[22] Filed: Dec. 27, 1985

[30] Foreign Application Priority Data

Dec. 28, 1984 [JP] Japan ............................. 59-274801
Jan. 30, 1985 [JP] Japan ............................. 60-14547

[51] Int. Cl.$^4$ ............................................. G01N 23/04
[52] U.S. Cl. ........................................ 378/4; 378/20; 378/61
[58] Field of Search ................ 378/61, 4, 20; 73/146

[56] References Cited

U.S. PATENT DOCUMENTS

| | | | |
|---|---|---|---|
| 3,527,091 | 6/1968 | Reus | 73/146 |
| 3,621,246 | 11/1971 | Horsey et al. | 73/146 |
| 3,807,226 | 4/1974 | Williams | 73/146 |
| 3,883,744 | 5/1975 | Steffel | 378/61 |
| 4,149,247 | 4/1979 | Pavkovich et al. | |
| 4,149,249 | 4/1979 | Pavkovich | |
| 4,283,629 | 8/1987 | Habermehl et al. | 378/4 |

Primary Examiner—Carolyn E. Fields
Assistant Examiner—David P. Porta
Attorney, Agent, or Firm—Foley & Lardner, Schwartz, Jeffery, Schwaab, Mack, Blumenthal & Evans

[57] ABSTRACT

A tire load testing CT scanner includes a load applying mechanism for applying a load to a tire under a condition in which the tire is rotatably held, a radiation imaging device for obtaining radiation transmittance data of the tire cross section, a moving mechanism for relatively moving the radiation imaging device and the tire which is placed in a condition loaded by the load applying mechanism, in a direction along the circumference of the tire, a drive control unit for controlling the drive of the load applying mechanism, the radiation imaging device, and the moving mechanism, and an image formation and processing unit for forming an image, based on the transmittance data supplied by the radiation imaging device.

17 Claims, 12 Drawing Sheets

TIRE LOAD TEST CT SCANNER

FIELD OF THE INVENTION

The present invention relates particularly to a CT (computer tomography) scanner for tire load tests which is used for inspecting the cross-sectional structure of the tire under a loaded state.

BACKGROUND OF THE INVENTION

With the progress in CT scanners in recent years, it is desirable to apply them not only to the medical field but also to the general industrial field. In fact, in some areas of the industrial field they are already being put into practical use.

Along with the high power output of engines for automobiles and motorcycles due to recent improvement in their performance there is also a need to improve in the performance of tires from the viewpoint of safety. To this end, there is a need for a device which is capable of conveniently carrying out various tire performance tests with high precision, and it is expected that the CT scanner will apply to this field. In the existing state of affairs, there is such a device which takes CT scans of a cut sample specimen placed on a specimen table that is installed between a radiation source and a radiation detector by rotatively moving the specimen table for more than (180° + fan angle), or takes CT scans of an uncut tire by rotatively moving the table also for an angle of more than (180° + fan angle).

However, these methods of CT scanning all represent tests of a tire under a resting condition. For this reason, in applying the CT scanner to the testing of tire characteristics by taking full advantage of the nondestructive nature of the CT scanner, appearance of a CT scanner which is adapted for testing the characteristics under the operating conditions, namely, those characteristics in the loaded or running conditions of the tire has been desired earnestly.

Moreover, from the nondestructive inspection point of view, it is conceivable to use an X-ray television system for such tests of tire characteristics. However, because of the fact that the information obtained by such a method represents a two-dimensional perspective image which is an integration of a three-dimensional information, sufficiently detailed inspection may not be expected to be obtained for items with a intricate structure such as a tire.

SUMMARY OF THE INVENTION

An object of the present invention is to provide a tire load testing CT scanner which makes it possible to carry out an inspection of a cross-sectional structure of a tire by means of CT images taken under varying air pressure of the tire.

Another object of the present invention is to provide a tire load testing CT scanner which makes it possible to carry out an inspection of a cross-sectional structure of a tire under a loaded condition of the tire.

A further object of the present invention is to provide a tire load testing CT scanner which makes it possible to carry out an inspection of a cross-sectional structure of a tire under a rotating and running condition of the tire.

A still further object of the present invention is to provide a tire load testing CT scanner which makes it possible to carry out an inspection of a cross-sectional structure of a tire by relatively moving the tire and the radiation imaging device in a specific cross section of the tire.

In order to achieve the above objects, the tire load testing CT scanner in accordance with the present invention includes a load applying mechanism which applies a load to the tire, a radiation imaging device which obtains projection data of a specific cross section of the tire, a moving mechanism which moves the radiation imaging device relative to the tire in the specific cross section of the tire under the condition in which the tire is loaded by the load applying mechanism, a drive control unit which drives and controls the load applying mechanism, the radiation imaging device, and the moving mechanism, and an image formation and processing unit which forms an image based on transmittance data for the specific cross section of the tire obtained by the radiation imaging device.

BRIEF DESCRIPTION OF THE INVENTION

DESCRIPTION OF THE PREFERRED EMBODIMENTS

Figure 1:
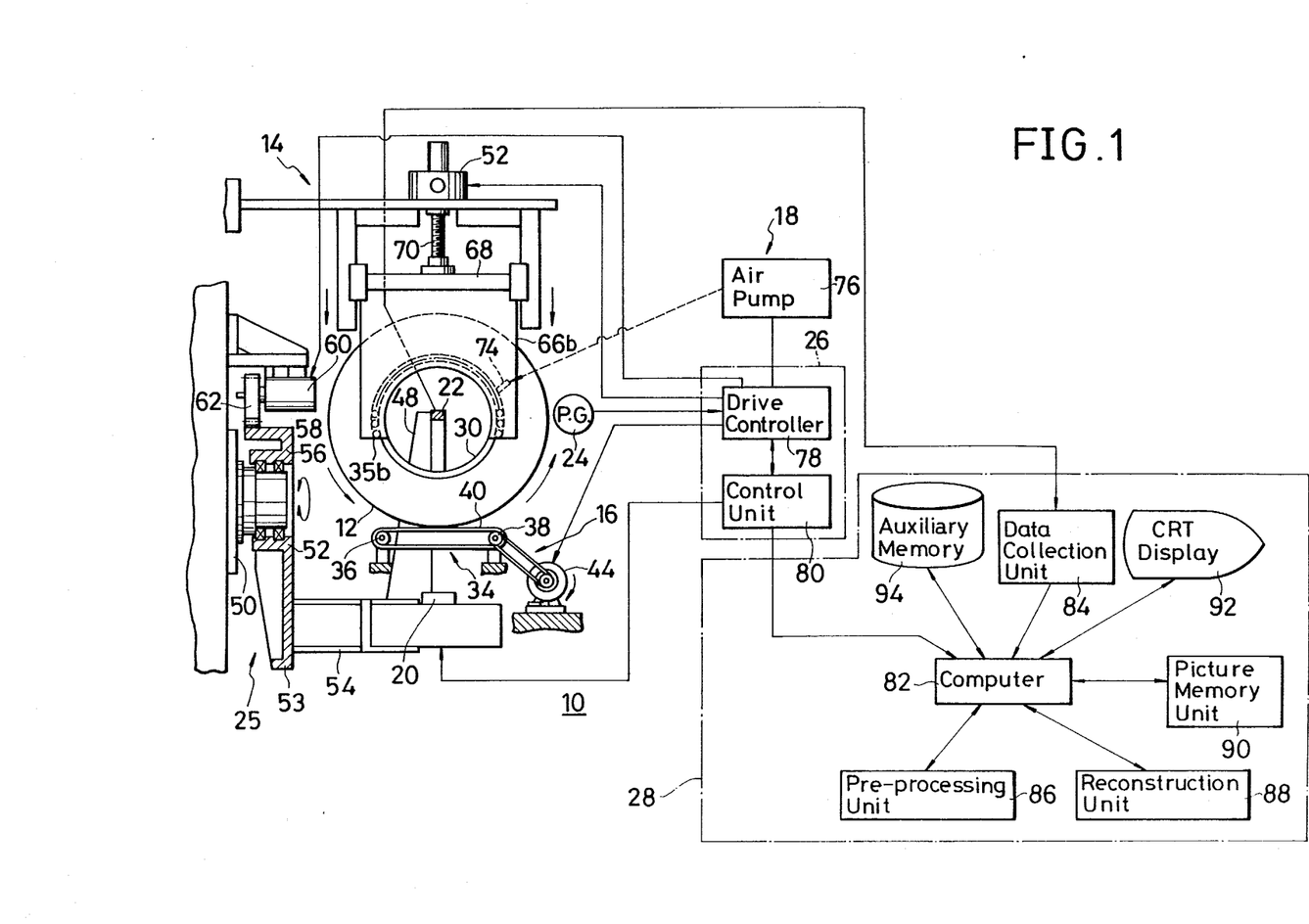
FIG. 1 is an overall block diagram for a tire load testing CT scanner embodying the present invention.
Figure 2:
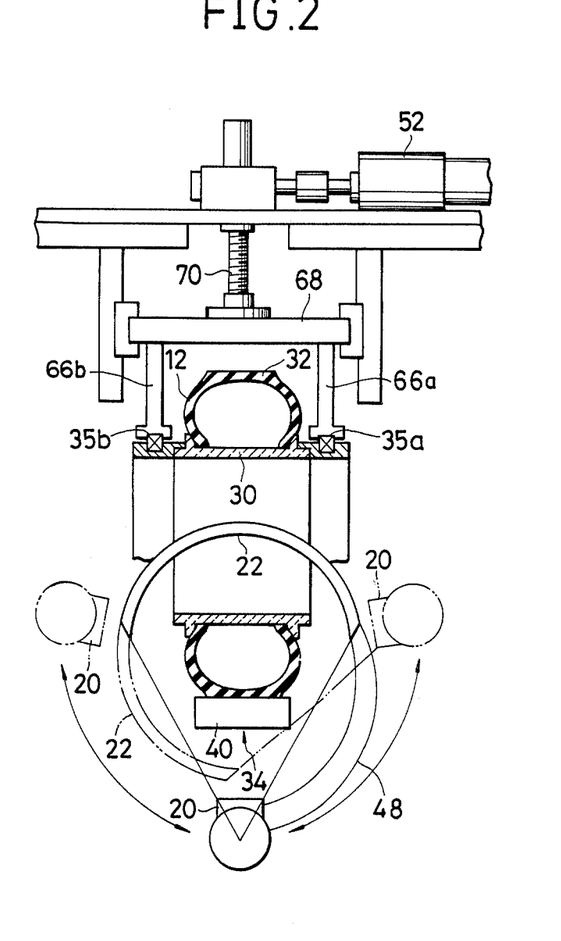
FIG. 2 is a front view of the load applying mechanism and the rotation mechanism in the tire load testing CT scanner shown in FIG. 1.
Figure 3:
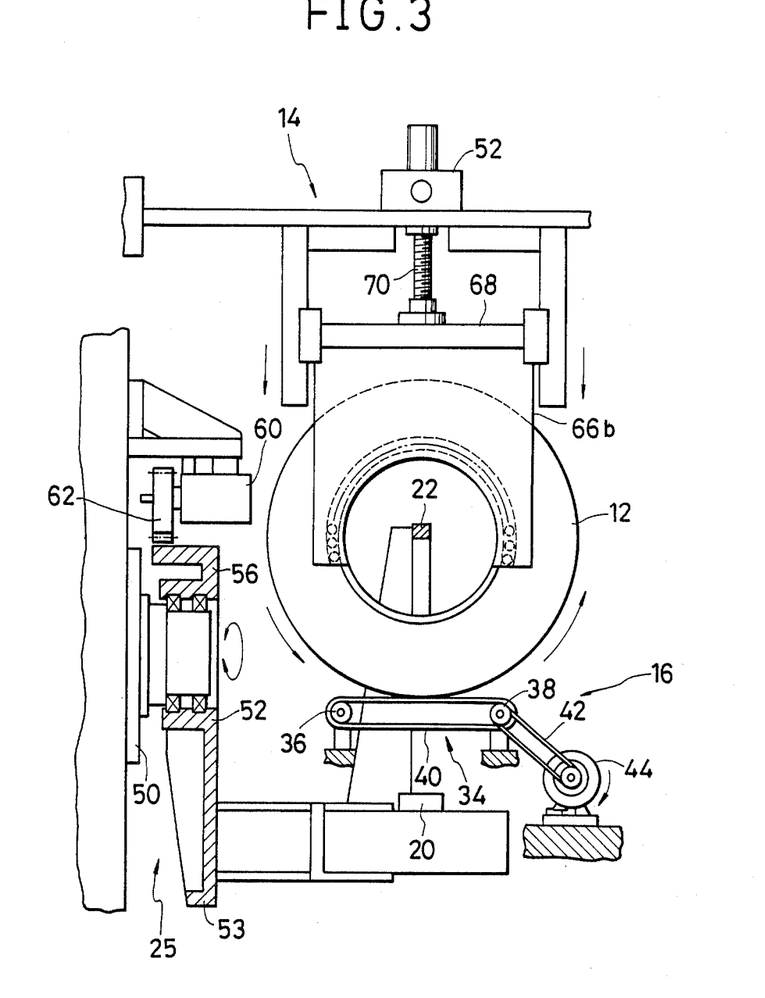
FIG. 3 is a side view of the mechanisms shown in FIG. 2.

Referring to FIGS. 1 to 3, a tire load testing CT scanner embodying the present invention is shown with reference numeral 10.

The testing CT scanner 10 includes a load applying mechanism 14 for applying a load to a tire 12 under the condition in which the tire is supported rotatably, a tire rotation mechanism 16 for realizing a condition which is similar to the running condition of the tire by rotating the tire 12 under a loaded condition, a tire internal pressure varying mechanism 18 for varying the air pressure within the tire 12, a radiation imaging device which is formed by arranging a radiation source 20 for outputting fanned beams of radiation to obtain radiation transmittance data of a tire cross section and a radiation detector 22 for detecting the attenuated amount of radiation to face each other with the tire in between, a tire rotation detector 24 for detecting the rotation of the tire, a moving mechanism 25 for swingingly moving the radiation imaging device in the plane of a specific cross section of the tire, a drive control unit 26 for controlling the drive of the load applying mechanism, the tire rotation mechanism 16, the tire internal pressure varying mechanism 18, and the tire moving mechanism 25, as well as for controlling the radiation output of the radiation source 20, and an image formation and processing unit 28 for forming an image based on the transmittance data that is detected.

As shown in FIG. 2 and FIG. 3, the tire running rotation mechanism 16 includes a drum 30 for supporting the tire 12 and a belt mechanism 34 installed facing the ground contacting plane 32 of the tire 12. The drum 30 is supported freely movably toward the belt mechanism 34, and freely rotatably by the bearings 35a and 35b.

The belt mechanism 34 includes a belt member 40 which is wound between two pulleys 36 and 38 along the direction of the circumference of the tire 12. The belt member 40 is driven by the driving pulley 38 of the two pulleys via a belt 42. On the drum 30 there is installed a rotation detector 24. The radiation detector 22 of the radiation imaging device is installed on the side of the drum 30 and is fixed as a unified body to the radiation source 20 via a supporting body 48. The imaging device moving mechanism 25 includes an arm member 52 which has two arms that are freely rotatable with respect to the base platform 50. On one of the arms, 52, there is supported the radiation source 20 via a frame 54, while on the other arm 56 there is installed a sector gear 58. Coupled with the sector gear 58 is a pinion 62 which is mounted on the axis of a fixed motor 60. Therefore, by the action of the motor 60 the arm member 52 rotates with the base platform as the center, by which the radiation source 20 and the radiation detector 22 are swingingly moved in a specific cross-sectional plane of the tire.

The load applying mechanism 14 includes supporting members 66a and 66b for supporting respectively the bearings 35a and 35b that support the drum 30 so it is freely rotatable. The supporting members 66a and 66b are attached to a movable beam 68. The movable beam 68 is engaged with a screw 70, and is arranged to be moved toward the belt mechanism 34 through rotation of the screw 70 by the drive of a fixed motor 52. Therefore, by driving the motor 52 of the load applying mechanism 14, the movable beam 68 and the drum 30 can be moved in the direction of the belt mechanism 34. As a result, the tire 12 makes contact with the belt member 40 of the belt mechanism 34, and it becomes possible to apply a compressive load to the tire in the radial direction of the tire 12. Then, by the action of the motor 60, the belt member 40 is driven in the direction of the circumference of the tire, bringing the tire to a condition which is similar to that of running on the road surface.

The tire internal pressure varying mechanism 18 comprises an air pump 76 for supplying air to the tire 12 through an air nozzle 74 at the time when the rotation of the tire 12 is interrupted. The drive control unit 26 comprises a drive controller 78 which drives and controls the motor 44 for the belt mechanism 34, the motor 52 for the load applying mechanism 14, and the motor 60 for the imaging device moving mechanism 25, and controls as well the operation of the air pump 76 which injects air into the tire 12, and a control unit 80 which controls the radiation output from the radiation source 20, controls the data acquisition of the transmittance data for the output radiation detected at the radiation detector 22 at the image formation and processing unit 28, and, further, controls the drive controller 78.

The image reconstruction and processing unit 28 forms an image based on the radiation signal detected by the radiation detector 22, as disclosed in U.S. Pat. Nos. 4,149,247–4,149,249. It comprises a computer 82 consisting of a microcomputer or the like, and a group of components, namely, a data acquisition unit (DAS) 84, a pre-processing unit 86, a reconstruction unit 88, an image memory unit 90, a CRT display 92, and an auxiliary memory 94, that are all connected to the computer 82. The data acquisition unit 84 is for collecting data on radiation transmittance which is detected by the radiation detector 22 in accordance with the data acquisition signal that is supplied by the control unit 80 via the computer 82. The pre-processing unit 86 provides pre-processing of the transmittance data which is supplied to the computer 82 by the data acquisition unit 84 under the control of the computer 82. The transmittance data that has undergone such a pre-processing is stored in the image memory unit 90 temporarily. The reconstruction unit 88 forms an image reconstruction data for reconstructing an image based on the transmittance data. The image reconstruction data is stored in the auxiliary memory 94 via the computer 82, and is also supplied to the CRT display 92 to display the CT image on the CRT display 92.

Figure 4:
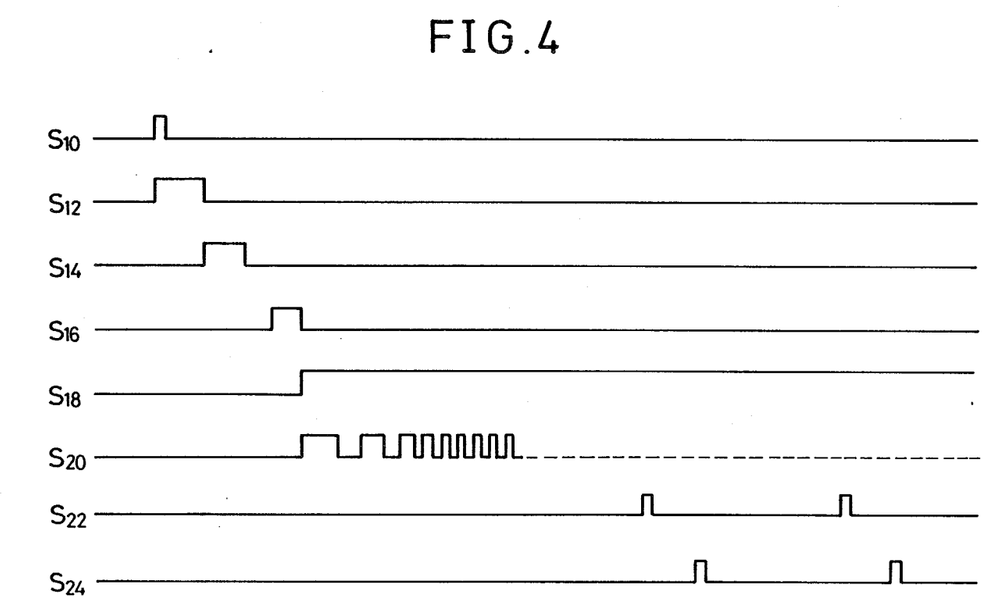
FIG. 4 is a time chart which illustrates the operation of the drive control unit and the image processing unit shown in FIG. 1.

Next, the operation of the present embodiment will be described by referring to the time charts shown in FIG. 4.

First, when a start pulse signal $S_{10}$ for the test operation is supplied from the control unit 80 to the computer 82, the control unit 80 supplies a signal $S_{12}$ to the radiation source 20 to confirm whether or not the source is ready to operate. Then, upon receipt of a signal $S_{14}$ which indicates that the control unit 20 is ready to operate, the control unit 80 outputs a drive pulse signal $S_{16}$ to the drive controller 78. In accordance with the receipt of the drive pulse signal $S_{16}$, the drive controller 78 supplies a drive signal $S_{18}$ to the motors 44 and 52 in order to give a fixed rate of rotation and a fixed load to the tire 12, by which the motors 44 and 52 are driven in accordance with the drive signal $S_{18}$.

Namely, the motor 52 causes the screw 70 to be driven and rotated to move the moving beam and the tire 12 toward the belt member 40 of the tire running rotation mechanism 16, and brings the belt member 40 and the tire 12 into contact under a prescribed load. At the same time, the motor 44 causes the belt member to be driven and rotated at a fixed speed, and the tire 1 is rotated by the drive of the belt member to be brought to a condition which is similar to that of running. The rotation of the tire 12 is detected by a rotation detector, for example, an encoder, and the detected quantity is outputted to the control unit 80 as a pulse signal $S_{20}$ corresponding to the speed of rotation. When a situation is realized in which the pulse signal $S_{20}$ is generated at a fixed time interval, the control unit 80 judges that the tire 12 is set to a predetermined rate of rotation under a predetermined load. Upon judgment by the control unit 80 that a constant speed of rotation is realized, it outputs to the radiation source 20 a radiation generation pulse signal $S_{22}$ at an interval corresponding to one rotation of the tire 12, and also outputs to the drive controller 78 a pulse signal $S_{24}$ that is delayed by a predetermined length of time with respect to the radiation generation pulse signal, in order to drive the motor 60 for the imaging device moving mechanism 25. Due to this arrangement, the motor 60 is driven at a predetermined time after emission of radiation from the radiation source 20, and the radiation source 20 and the radiation detector 22 are swingingly moved by a predetermined angle, for example, 0.6° in a specific cross-sectional plane of the tire over a range of angle of approximately 180°+ fan. Therefore, it becomes possible to correct image data of the specified cross section of the tire by rotating the tire 12 at a predetermined speed and under a predetermined load condition.

Moreover, it is also possible to obtain CT images of the tire 12 while it is under acceleration by detecting the pulse width of the output pulse $S_{20}$ prior to the setting, computing the acceleration based on the value of the pulse width, and by forming a radiation generation pulse to be sent to the radiation source 20.

In the tire load testing CT scanner in accordance with the present invention, it is possible to obtain from the radiation detector 22 the transmittance data concerning a prescribed cross section of the tire 12 by carrying out various forms of tests that follow, under the control of the control unit 80, after setting the tire 12 to be tested in the load applying mechanism 14.

a. The internal pressure of the tire 12 is varied by supplying air to the tire 12 at a rate of fixed amount per unit time, for example, from the air pump 76 via the air nozzle 74. The transmittance data for the changes in the cross-sectional structure of the tire 12 for an increase in the internal pressure can be obtained by activating the radiation source 20 at an interval of, for example, the time unit mentioned above.

b. The movable beam 68 and the drum 30 can be moved by driving the motor 52 under the control of the drive controller 78 at a fixed distance per unit time, for example, toward the side of the belt mechanism 34. By this arrangement, transmittance data can be obtained for the changes in the cross-sectional structure of the tire 12 corresponding to the increase in the load.

c. The rotational speed of the tire 12 may be increased with the interval of the unit time, for example, by the motor 44 under the control of the drive controller 78. Then the transmittance data can be obtained for each speed of rotation of the tire 12, by detecting it with the rotation detector 46. That is, it is possible to obtain transmittance data concerning changes in the structure of the same cross section of the tire 12 corresponding to the increases in the rotational speed.

d. It is possible to obtain changes with time in the cross-sectional structure of the tire 12 corresponding to the conditions, for example, of constant speed of rotation and constant loading, namely, transmittance data for the running life of the tire 12 corresponding to the increase in the traveled distance. Further, as to the traveled distance, the rotation detector 46 detects one rotation of the tire 12, so that the desired data can easily be computed from the above two kinds of data if the diameter of the tire 12 is known.

e. By an appropriate combination of the tests a. to d., it becomes possible to obtain transmittance data corresponding to the changes in the cross-sectional structure of the tire 12 under complex conditions.

Figure 5:
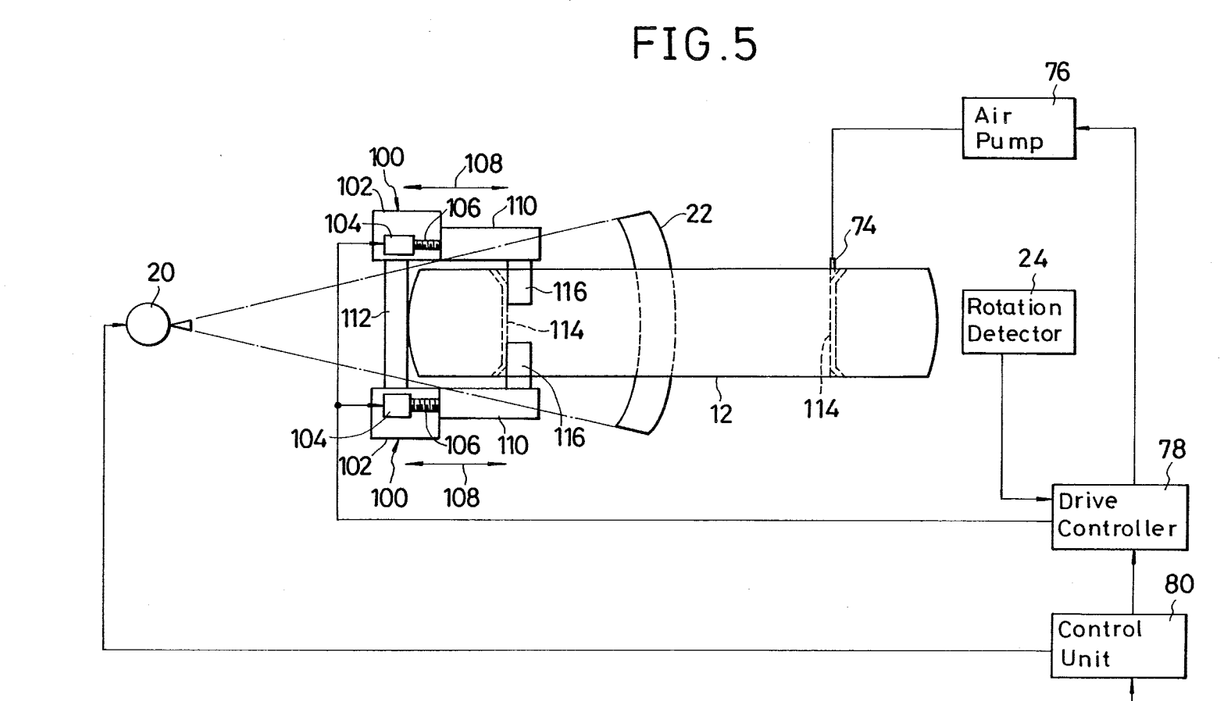
FIGS. 5 and 6 are the front view and the side view, respectively, of a modification to the load applying mechanism and the rotation mechanism.
Figure 6:
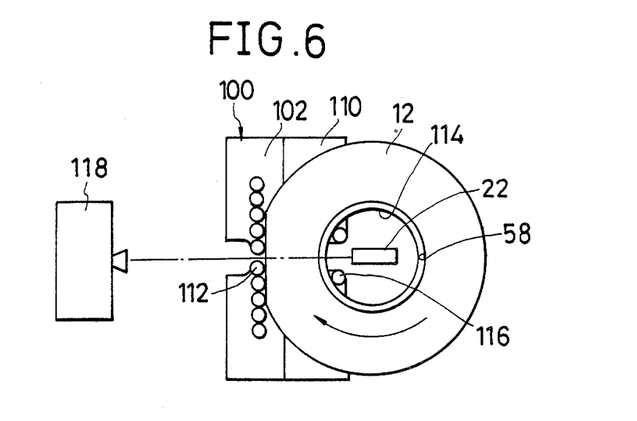

Next, referring to FIG. 5 and FIG. 6, a modification to the load applying mechanism for the tire load testing CT scanner in accordance with the present invention will be described.

The modification includes a pair of side panels (in FIG. 6, however, only one of them is shown for reasons of convenience in explanation) 100 that are arranged separated by a distance which is slightly larger than the width of the tire. Each of the side panels 100 is constructed of a fixed section 102 and a movable section 110 which is coupled with a screw mechanism 106, such as a ball screw that is supported axially by a motor 104 which is installed in the fixed section 102, and is movable in the direction of the arrow 108 in accordance with the rotational drive of the motor 104. In addition, the fixed section 102 has a construction that can house a portion of the movable section 110 when the movable section 110 moves in the direction of the arrow 108. Further, the drive of the motor 104 is controlled by the drive controller 78 that operates under the control of the control unit 80, as in the first embodiment. On the other hand, between the fixed sections of the pair of side panels 100, there are disposed a plurality of loading rollers 112, approximately linearly and in a continuous manner. Further, in the end sections of the movable sections 110 there are installed back-up rollers 116 for supporting the inner circumferential surface 114 of the tire 12, under the set condition of the load applying mechanism for the tire 12.

Figure 7:
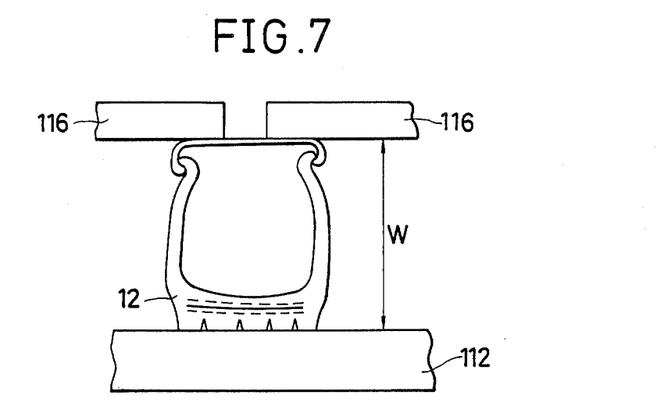
FIGS. 7 and 8 are explanatory diagrams for illustrating the operation of the load applying mechanism shown in FIG. 6.
Figure 8:
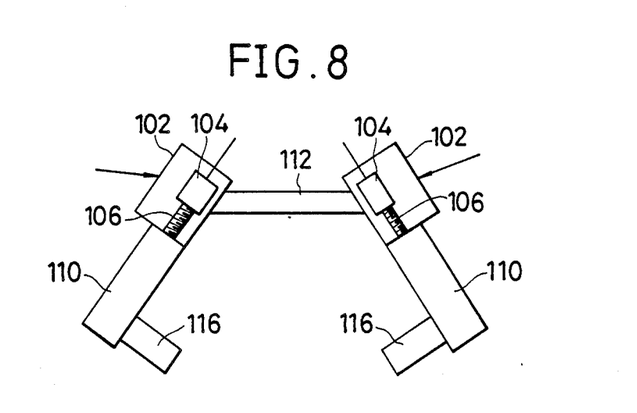

Accordingly, in the above load applying mechanism, as shown in FIG. 7, it becomes possible to narrow effectively the separation W between the loading rollers 112 and the back-up rollers 116 by moving the movable sections 110 of the pair of side panels 100 toward the fixed sections 102 under the set condition of the tire 12. As a result, it becomes possible to apply a compressive load, which is similar to the load that appears while driving on the road surface, in the radial direction of the tire 12. Further, the above loading rollers 112 are disposed with a wider separation than the other parts in order to make it possible to irradiate the tire 12 with fanned beams from a radiation source 118 (see FIG. 6). Moreover, the load applying mechanism is constructed, as shown in FIG. 8, so as to allow the side panels 100 to be opened with respect to the loading rollers 112, the opened state being available for setting or releasing the setting of the tire.

Therefore, by combining the above modification of the load applying mechanism with the drive control unit 26 and the image formation and processing unit 28 of the first embodiment, it becomes possible to carry out various tests as in the first embodiment, and by so doing, obtain similar effects.

Figure 9:
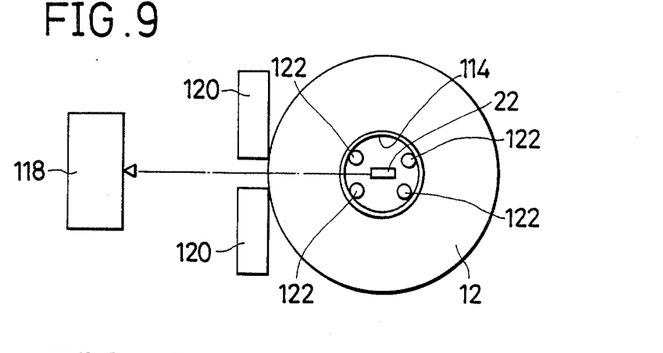
FIGS. 9 through 11 are side views for other modifications of the load applying mechanism.
Figure 10:
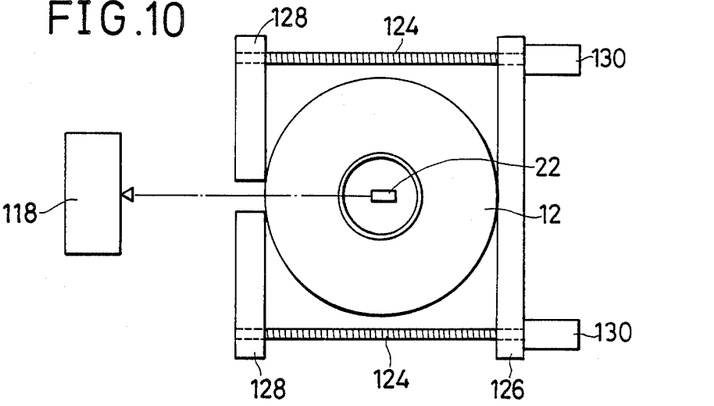
Figure 11:
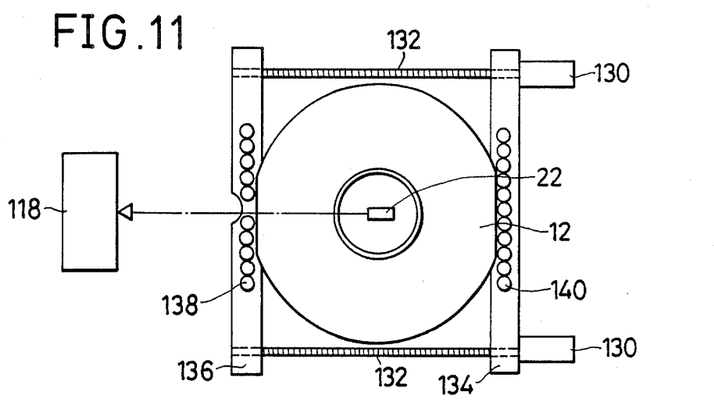

Next, referring to FIGS. 9 to 11, other modifications of the load applying mechanism will be described.

a. As shown in FIG. 9, by constructing a load applying mechanism with pressing members 120 which support the tire 12 under a prescribed load after it is set, and back-up rollers 122 which press the tire 12 from its inner circumferential surface 114, the mechanism can be applied to testing for changes in the cross-sectional structure of the tire 12 with respect to increases in the internal pressure under a particular condition, for example, of a constant load.

b. A load applying mechanism may be constructed with a pair of pressing members 126 and 128 which are linked in the proximity of both their ends with screw mechanisms 124, as shown in FIG. 10, and further, by mounting motors 130 for driving and rotating the screw mechanisms 124, for example, on the pressing member 126. With such an arrangement, it becomes possible, for example, to measure the changes in the cross-sectional structure of the tire 12 for loading from both sides of the tire 12 under various conditions, for example, increasing or decreasing the internal pressure of the tire, by adjusting, after setting of the tire 12, the separation between the pressing members through rotation of the screw mechanisms 124 by controlling the rotation of the motors 130.

c. As shown in FIG. 11, a load applying mechanism may be constructed by a pair of approximately parallel members 134 and 136 which are linked in the neighborhood of both their ends by screw mechanisms 132, and a plurality of rollers 138 and 140 which are arranged approximately linearly with respect to the nearly parallel members 134 and 136. With such a mechanism, it becomes possible to carry out tests for the rotated state of the tire 12, in addition to the test described in connection with the modification b.

The above explanation of the present invention describes a device for constructing cross-sectional images of a tire by irradiating the tire with radiation, such device being equipped with means for supplying air to the tire and with means for controlling the load to be applied to the tire. Therefore, the device enables one to carry out cross-sectional structure inspections of the tire by means of CT scanning under various kinds of loaded conditions that were impossible in the past. The device will bring substantial effects to quality control and cost reduction through active application of the device to the various kinds of structural inspections in the course of development, confirmation of optimum structure, confirmation of what happens for change in the manufacturing techniques, and so on, of the tire.

Next, referring to FIGS. 12 to 18, a second embodiment of the tire load testing CT scanner in accordance with the present invention will be described.

Figure 12:
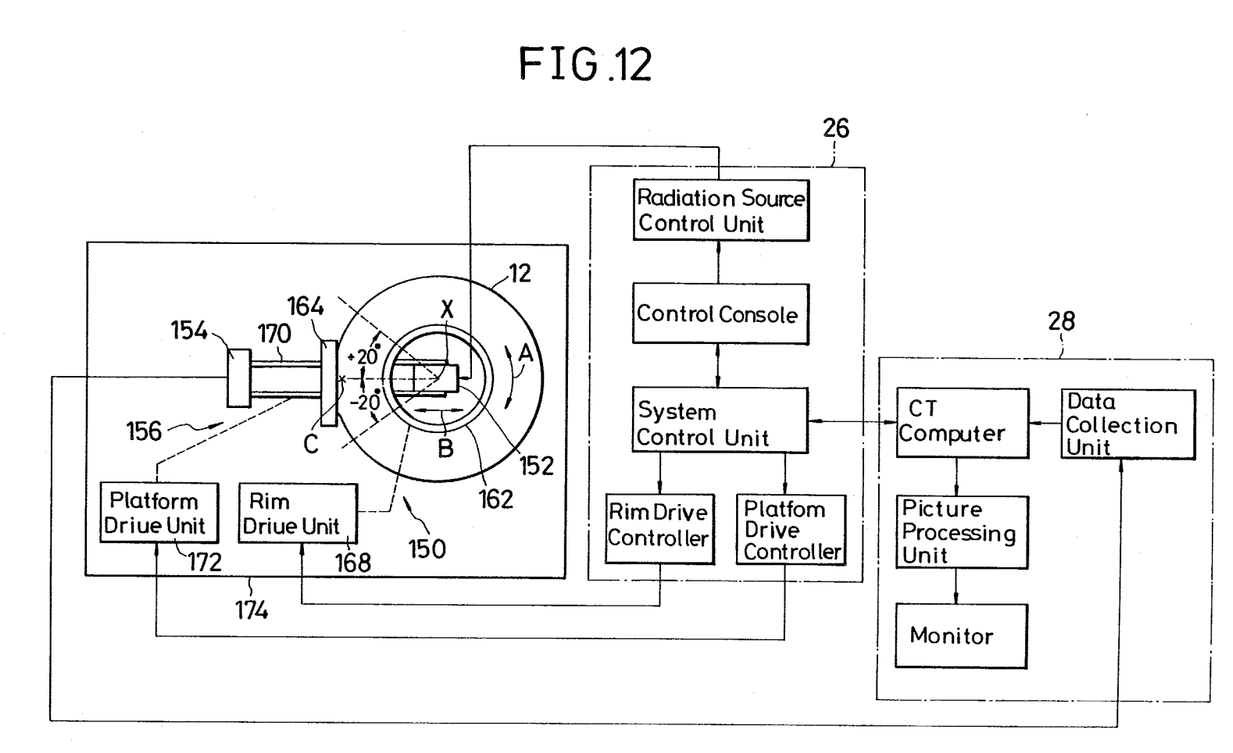
FIG. 12 is an overall block diagram for a second embodiment of the tire load testing CT scanner in accordance with the present invention.

The second embodiment includes, as may be seen from FIG. 12, a load applying mechanism 150 which has a function similar to the mechanism in the first embodiment, a moving mechanism 156 which moves a radiation source 152 and a radiation detector 154 relative to the tire 12, a drive control unit 26 similar to that in the first embodiment for driving the load applying mechanism 150 and the moving mechanism 156, and an image formation and processing unit 28 similar to that in the first embodiment which forms an image by processing data sent from the radiation detector 154.

The load applying mechanism 150 has a rim 162, made of a material such as aluminum or plastic that has a smaller X-ray absorption factor, for mounting the tire 12, and is supported freely rotatably as shown by the arrows A and freely movably in the radial direction of the tire as shown by the arrows B. A pressure receiving panel 164 is arranged facing the rim 162, with the tire 12 in between, and a rim driving unit 168 such as a motor for moving the rim in the direction of the arrows B is mounted on the rim 162. Consequently, by moving the tire 12 in the direction of the arrows B by means of the rim driving unit 168, the tire 12 is compressed against the pressure receiving panel 164. The pressure with which the tire 12 is compressed against the pressure receiving panel 164 may be chosen to be 10 tons for tires of trucks and buses, and 15 tons for tires of passenger cars.

Figure 13:
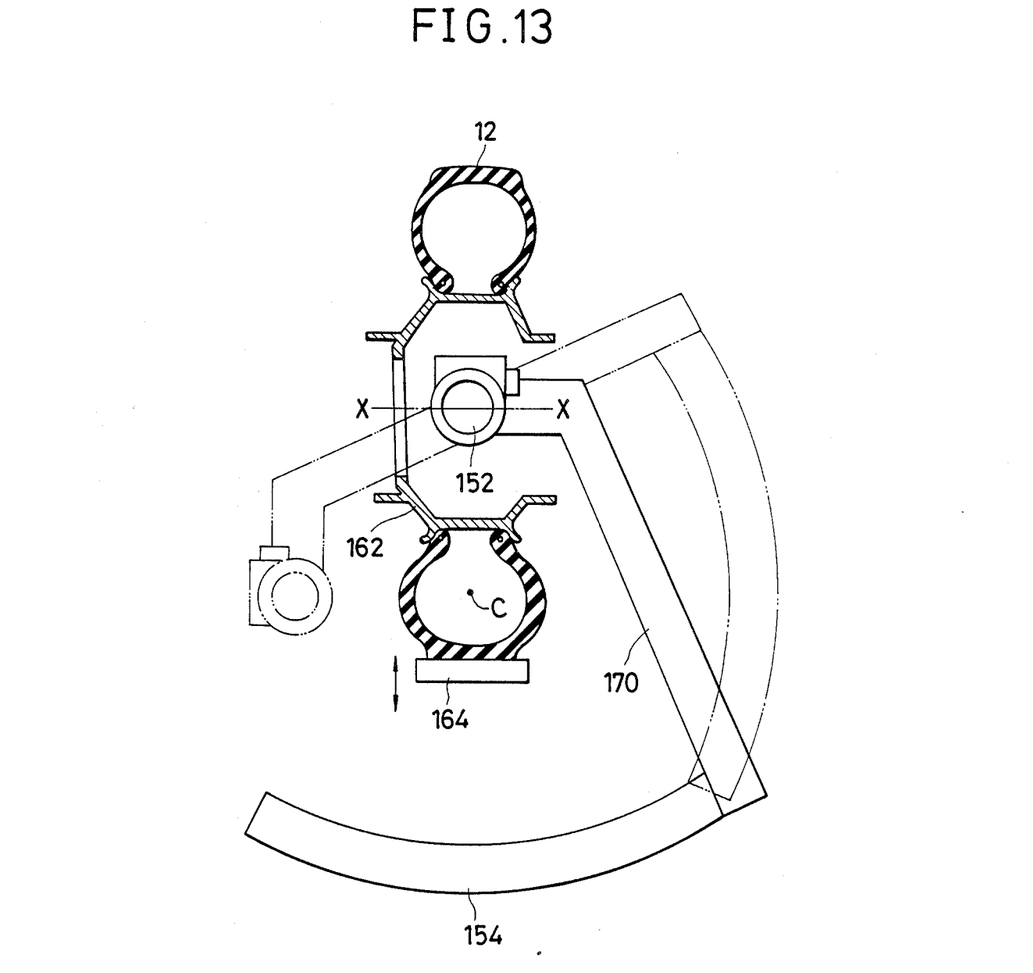
FIG. 13 is an explanatory diagram for illustrating the operation of the frame in the second embodiment shown in FIG. 12.

The moving mechanism 156 includes a frame 170 for supporting the radiation source 152 and the radiation detector 154 to be linked to maintain mutually prescribed relative positions. The frame 170 is constructed so as to be freely swingable over a range of angle of approximately 180°+ fan in a cross-sectional plane of the tire, with a point C in the interior of the tire 12 as the center, as shown in FIG. 13. At the same time, the frame 170 is constructed to be freely swingable over a range of angle of approximately ±20° along the circumference of the tire with the tire axis X as the center, in order to make it possible to take CT images of the tire 12 at a plurality of positions. The moving mechanism 156 has a frame moving unit 152 such as a motor for driving and rotating the frame 170 as described above. Moreover, the entirety of the above device is accommodated in a housing 174 that possesses an X-ray shielding function in order to prevent the leakage of X-rays from the radiation source 152.

The drive control unit 26 is for controlling the drive of the rim driving unit 165 of the load applying mechanism 150 and a frame driving unit 172 of the moving mechanism 156, as well as for controlling the radiation output of the radiation source 152. Since its function is similar to that described in the first embodiment no further explanation will be given.

Next, successive operations for forming a CT image of the tire by the use of the second embodiment of the CT imaging device in the above will be described. The tire 12 to be inspected is mounted on the rim 162, and its air pressure is adjusted to a prescribed value. Next, the tire 12 and the rim 162 are rotated as shown by the arrow A in order to bring the portion of the tire whose CT images are desired to the position that faces the pressure receiving panel 164. It is of course necessary to keep the tire 12 removed from the pressure receiving panel 164 during the above operation. Next, the drive control unit 26 drives the rim driving unit 168 to move the rim 162 in the direction of the pressure receiving panel 164, and presses the tire 12 with a predetermined pressure against the pressure receiving panel 164. Next, the drive control unit 26 drives the frame driving unit 172 to rotate the frame 170 along the circumference of the tire 12 with the tire axial line X as the center, in order to arrange the radiation source 152 and the radiation detector 154 on a desired cross-sectional plane of the tire. If one assumes that the frame 170 is set to a condition as illustrated by FIG. 12, then there will be obtained a CT image of the tire 12 of the center of its treading surface. Next, when the radiation source 152 is driven by the drive control unit 26, radiation is emitted. The emitted radiation impinges upon the radiation detector 154 through the rim 162, the tire 12, and the pressure receiving panel 164, and is converted to an electrical signal. The signal output from the radiation detector 154 is sent to the image formation and processing unit via the drive control unit 26 which is analogous to that shown in the first embodiment. The CT image can show extremely clearly the conditions of the rubber layers that constitute the tire, the conditions of the cords that are embedded in the interior of the rubber, and so forth.

Next, for taking a CT image for another part of the same tire, the frame drive unit 172 is driven via the drive control unit 26 to rotate the frame 170 along the circumference of the tire 12 with the axial line X as the center, in order to bring the radiation source 152 and the radiation detector 154 on a desired cross-sectional plane. Needless to say, it is not necessary in this case to drive the rim drive unit 168, and the tire 12 is held in a state with a load applied. Hereafter, the required operations are similar to those described in the foregoing embodiment, and CT images can be obtained in the same manner.

Figure 14:
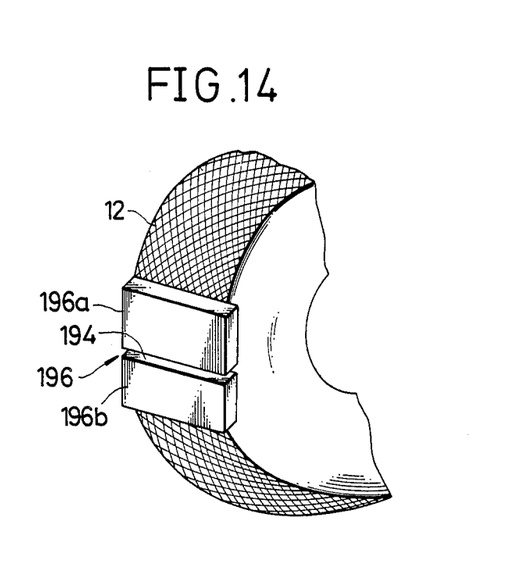
FIGS. 14 and 15 are simplified diagrams for the modifications to the pressure receiving panel in the second embodiment shown in FIG. 12.

In the second example shown in FIG. 12, the radiation detector 154 receives radiation that has penetrated the pressure receiving panel 164. Since, however, the pressure receiving panel 164 has to be made with sufficient thickness in order to be able to withstand a considerably high pressure, it may happen that the X-ray absorption becomes undesirably large even when it is made by using a material with a low X-ray absorption. In such a case, a pressure receiving panel 196 may be constructed with two pressure reception half panels 196a and 196b that are arranged facing each other with a narrow gap 194 that is created extending in the direction of rotation of the frame 170, as shown in FIG. 14. When use is made of a pressure receiving panel 196 constructed as stated above, it becomes possible to eliminate the influence of X-ray absorption due to the pressure receiving panel by revolving the frame 170 within a plane that passes through the gap 194, since X-rays then impinge upon the radiation detector 154 through the gap 194. In this case, when the tire 12 is compressed against the pressure receiving panel, there will arise no influence of the pressure of the gap in the deformed state of the tire 12 since the width of the gap 194 formed in the pressure receiving panel 196 is very small.

Figure 15:
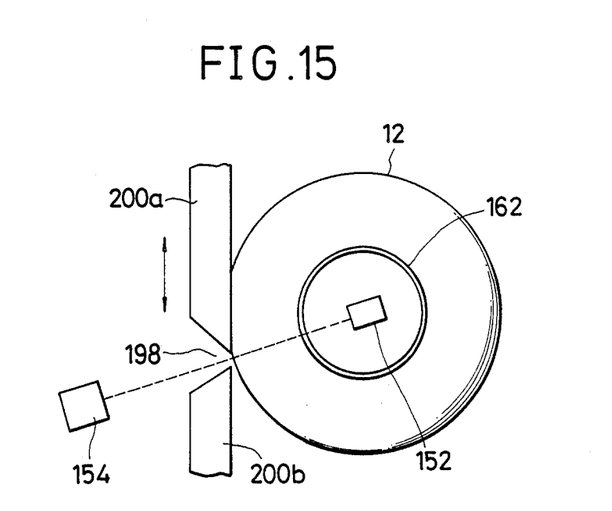

In the example shown in FIG. 14, the pressure receiving panel 196 is fixed so that if CT images are desired of the boundary area between the tire and the road surface, for example, X-rays will have to be absorbed by the pressure receiving panel 196. In order to remove such a disadvantage, a pressure receiving panel 200 may be constructed with two plate-like members 200a and 200b arranged facing each other so as to form a gap 198 that extends outward, as shown in FIG. 15, and arrange the pressure receiving panel 200 to be freely movable up and down in the directions of the arrows in the figure. By the use of such a pressure receiving panel 200 it becomes possible to obtain CT images of the boundary area between the tire and the tread surface, as shown by FIG. 15, without being affected by the presence of the pressure receiving panel.

Figure 16:
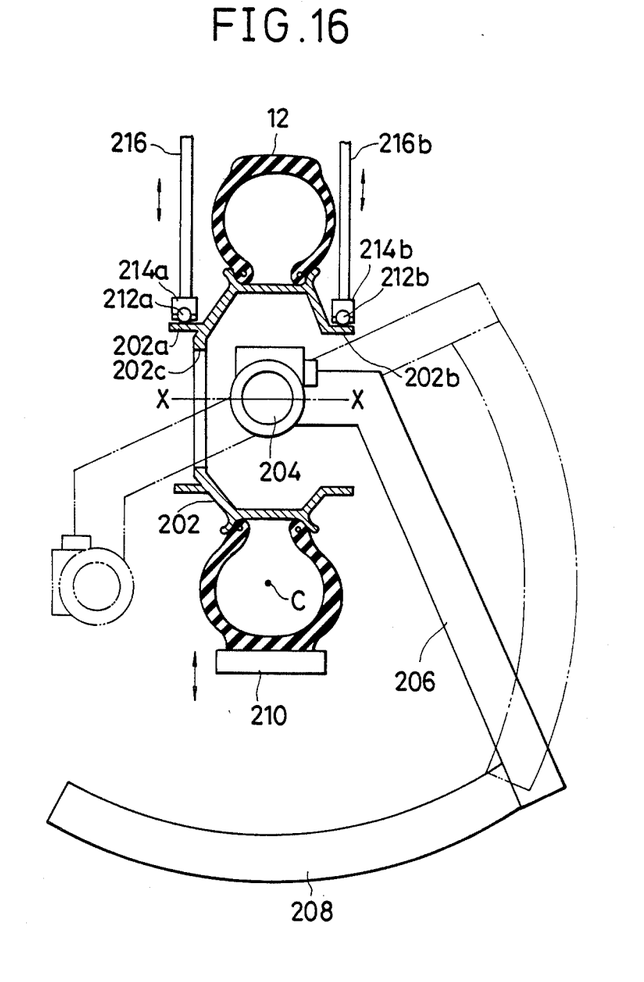
FIGS. 16 to 18 are simplified diagrams for showing the modifications to the load applying mechanism in the second embodiment shown in FIG. 12.
Figure 17:
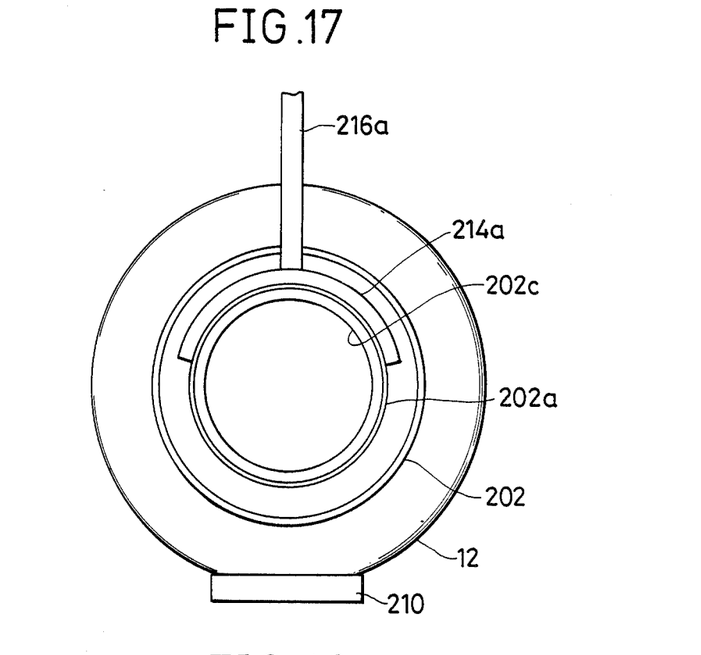

In the above embodiment, a load to the tire is arranged to be applied by moving the rim on which the tire is mounted toward the pressure receiving panel. However, it may be arranged to apply a load to the tire by pressing the pressure receiving panel against the rim. FIG. 16 shows a modification, constructed as above, to the CT scanner of the present invention. A tire to be inspected is mounted on a rim 202, and air is let in. At the center of the rim 202 there is created an opening 202c through which an arm-like frame 206 with a mounted radiation source 204 is arranged to be able to pass through freely. On the frame 206 there is mounted a radiation detector 208 which is formed by arranging X-ray sensor elements along a portion of a circular arc. The frame 206 is supported so as to make it possible to swing it with the axial line X—X of the tire as the axis, as well as to be able to rotate with an internal point C of the tire 12 as the center. Various forms of such a supporting mechanism can be considered although they are not shown explicitly. Further, a rim supporting mechanism as shown in FIG. 17 may be introduced, which rotatably supports the rim 202 as well as withstands the pressure from a pressing panel 210. Namely, flanges 202a and 202b may be formed on both sides of the rim 202 in a united body as shown in FIG. 16. These flanges may be engaged respectively with the receiving members 214a and 214b via ball bearings 212a and 212b as shown in FIG. 16, where these receiving members are supported in turn via rods 216a and 216b. The rods 216a and 216b are arranged to be movable in the upward and downward directions of FIG. 16 in order to permit the tire 12 to be mounted and dismounted from the rim 202. In such a rim supporting mechanism, the rim 202 rotates easily so that it is preferable to provide a braking mechanism.

In the present embodiment, the tire and rim assembly is mounted on the rim supporting mechanism after setting the tire 12 on the rim 202 and supplying air into it. Next, the tire 12 is rotated, and adjustment is made to bring the desired portion of the tire 12 to face the pressing panel 210. After fixing the tire 12 in this state by operating a braking mechanism, the pressing panel 210 is moved in the direction of the rim 202 to apply a predetermined load to the tire 12. Next, the frame 206 is rotated with the axial line X—X of the tire as the center, and CT images of the desired portion of the tire 12 are taken by energizing the radiation source 218 and rotating the rim 206.

Figure 18:
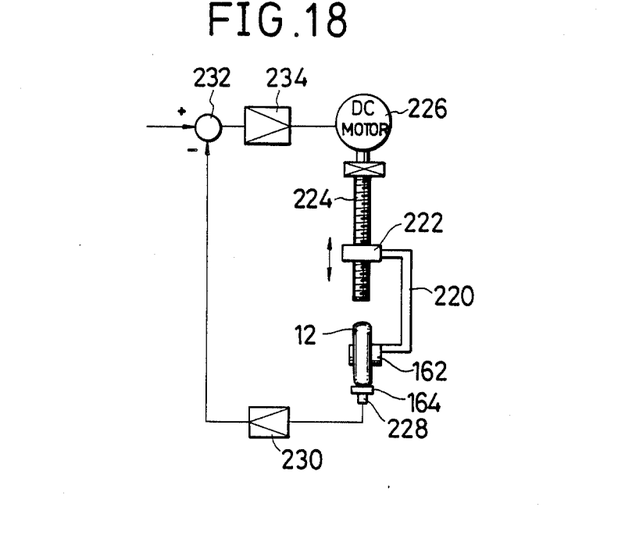

In FIG. 18 an example of a mechanism for applying a load to a desired portion of the tire is shown, which is applicable to the device shown in FIG. 12. The rim 162 with the tire 12 mounted on it is coupled with a nut 222 via an arm 220, and a screw 224 is fitted to the nut 222. The screw 224 is rotated by a dc motor 226. On the other hand, on the back surface of the pressure receiving panel 164 against which the tire 12 is pressed, there is arranged a pressure sensor 228 consisting of a load cell or Kisler cell, and the output of the pressure sensor is supplied to the negative side of a comparator 232 through an amplifier 230. A standard signal corresponding to a desired set load is input to the positive side of the comparator, and the output of the comparator is supplied to the dc motor 226 via an amplifier 234. Therefore, negative feedback is employed, and the dc motor 226 is driven in order to apply a predetermined set load to the tire 12.

According to the second example of the tire load testing CT scanner described in the foregoing, it becomes possible to observe nondestructively the internal structure of the tire under conditions equivalent to those that occur during the use in which the tire is inflated with air and is loaded. Therefore, it is possible to make an observation of the failure generating processes while continuing the drum tests or actual running. Moreover, since CT images can be obtained while varying the air pressure and the load, it is possible to make detailed observations on the behavior of each member that constitutes the tire. Since there is no need for cutting the tire as was required in the past, these observations can be made safely and efficiently and realize a reduction in the inspection cost. Finally, since it is possible to make comparative observations between a raw tire gauge before vulcanization and a manufactured tire, it is possible to realize a uniformity in the quality of the produced tires.

The present invention is not limited to the embodiments described above and numerous modifications of them will become possible. For instance, the foregoing embodiments are constructed to rotate the frame that holds the X-ray tube and the X-ray detector to predetermined relative positions with the tire axial line as the center, in order to obtain CT images of a plurality of portions of the tire under the loaded condition of the tire. Contrary to this, however, it is possible to rotate the tire with respect to the frame. In this case the construction of the device will become somewhat complicated since it is necessary to rotate the tire under a loaded condition. Further, although the frame was rotated in the foregoing examples in order to obtain data for the reconstruction of CT images, it may also be possible to rotate the tire with the frame kept stationary. Moreover, although it was arranged in the foregoing examples to obtain CT images of the tire under a condition in which a prescribed load is applied to it, it is possible to obtain CT images by varying the internal pressure of the tire in order to analyze the influence of the pressure on the internal structure of the tire. Finally although X-rays were utilized to obtain CT images in the foregoing examples, it is also possible to obtain a CT scanner which utilizes ultrasonic waves, various corpuscular rays, nuclear magnetic resonance, and others.

In summary, in accordance with the present invention, the device is constructed to obtain images of a cross section of a tire based on the transmittance data of radiation for the cross section of the tire which is irradiated with radiation. Since the device is constructed to have means for supplying air to the tire and means for controlling the load to be applied to the tire, it becomes possible to carry out inspections of the cross-sectional structure of the tire, by taking CT images under various kinds of loaded conditions, that were impossible to execute in the past. By the use of the present device, therefore, it will become possible to give substantial effects on quality control and cost reduction through its active application to various kinds of structural inspections during the development of a tire, confirmation of an optimum structure, confirmation of the results for changes in the manufacturing techniques, and so forth.

What is claimed is:

1. A tire load testing CT scanner for reconstructing a computer tomographic image of an overall cross section of a tire based on a radiation transmittance data for the cross section generated by irradiating the tire with fan beams, comprising:
   (a) load applying means for applying a load to the tire which is filled with air;
   (b) means for supporting the tire filled with air;
   (c) radiation imaging means for obtaining radiation transmittance data of an overall cross section of the tire by irradiating the tire with fan beams;
   (d) moving means for relatively moving said radiation imaging means and the overall cross section of the tire to which a load is applied by said load applying means such that a cross section of the tire is irradiated with the fan beams within an angle of more than (180 degrees + a fan angle of the fan beam) so as to obtain radiation transmittance data by which a computer tomographic image of the overall cross section is reconstructed; and
   (e) drive control means for driving and controlling said load applying means, said radiation imaging means, and said moving means.

2. The tire load testing CT scanner as claimed in claim 1, further comprising an image reconstruction means for reconstructing a computer tomographic image in accordance with the radiation transmittance data obtained by said radiation imaging means.

3. The tire load testing CT scanner as claimed in claim 2, further comprising internal tire pressure varying means for supplying air into the tire.

4. The tire load testing CT scanner as claimed in claim 3, further comprising second moving means for relatively moving the tire and said radiation imaging means in a direction along a circumference of the tire to which the load is applied by said load applying means.

5. The tire load testing CT scanner as claimed in claim 4, in which said first moving means comprises a radiation imaging means moving mechanism for rotating said radiation imaging means on the cross sectional plane of the tire around a predetermined center point through an angle of at least 180° such that the radiatio transmittance data of the overall cross section is obtained.

6. The tire load testing CT scanner as claimed in claim 4, in which said second moving means comprises a tire rotation and running mechanism for rotating and running the tire to which the load is applied by said load applying means.

7. The tire load testing CT scanner as claimed in claim 6, in which the tire rotation and running mechanism comprises a belt mechanism including a belt member installed facing a ground contacting surface of the tire, and a motor for rotating the belt member of the belt mechanism.

8. The tire load testing CT scanner as claimed in claim 7, in which said load applying means comprises supporting members for respectively supporting bearings that support the drum rotatably, a movable-beam engaged with a screw for supporting the supporting members, and a motor for rotating the screw, said load applying means being constructed so as to move the drum to the belt mechanism through the rotation of the screw by the drive of the motor.

9. The tire load testing CT scanner as claimed in claim 3, in which said internal tire pressure varying means comprises an air pump for supplying air to the tire while the tire rotation is interrupted.

10. The tire load testing CT scanner as claimed in claim 4, in which said second moving means comprises a moving mechanism for rotating said radiation imaging means along a circumference of the tire with an axial line of the tire as the center, in order to obtain computer tomographic images of a plurality of desired portions of the tire.

11. The tire load testing CT scanner as claimed in claim 10, in which the moving mechanism comprises a frame for supporting radiation imaging means so as to be linked with a predetermined mutually positional relationship, and a motor for rotating the frame over an angle range of approximately 180° in a cross section of the tire with a point within the tire as the center, as well as for driving and rotating the frame over an angle range of approximately ±20° along the circumference of the tire with an axial line X of the tire as the center in order to obtain computer tomographic images of a plurality of cross sections of the tire.

12. The tire load testing CT scanner as claimed in claim 11, in which said load applying means comprises a rim for mounting the tire, a pressure receiving panel placed acing the rim with the tire in between, and a motor for moving the tire in the radial dirction of the tire.

13. The tire load testing CT scanner as claimed in claim 1, wherein said supporting means comprises a rotatable drum for supporting the tire which is filled with air.

14. The tire load testing CT scanner as claimed in claim 1, wherein said supporting means comprises a rim for supporting the tire which is filled with air and wherein said load applying means comprises a pressure receiving panel arranged for facing the rim through the tire and a rim driving unit for moving the rim in the direction to the pressure receiving panel, the pressure receiving panel having a gap through which the fan beams pass.

15. A method of reconstructing a computer tomographic image of an overall cross section of a tire based on a radiation transmittance data of the cross section, comprising the steps of:
(a) supplying air to the tire;
(b) applying a load to the tire which is filled with air; and
(c) irradiating a cross section of the tire with fan beams within an angle of more than (180° + a fan angle of the fan beam) so as to obtain radiation transmittance data of the overall cross section of the tire to which the load is applied.

16. The method as claimed in claim 15, further comprising the step of reconstructing a computer tomographic image of the overall cross section of the tire in accordance with the radiation transmittance data obtained in the step (c).

17. The method as claimed in claim 16, further comprising the step of rotating and running the tire after the step (b).

* * * * *